United States Patent
Hall et al.

(10) Patent No.: US 10,972,715 B1
(45) Date of Patent: Apr. 6, 2021

(54) SELECTIVE PROCESSING OR READOUT OF DATA FROM ONE OR MORE IMAGING SENSORS INCLUDED IN A DEPTH CAMERA ASSEMBLY

(71) Applicant: Facebook Technologies, LLC, Menlo Park, CA (US)

(72) Inventors: Michael Hall, Bellevue, WA (US); Xinqiao Liu, Medina, WA (US); Zhaoming Zhu, Redmond, WA (US); Rajesh Lachhmandas Chhabria, San Jose, CA (US); Huixuan Tang, Redmond, WA (US); Shuochen Su, Seattle, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 41 days.

(21) Appl. No.: 16/418,510

(22) Filed: May 21, 2019

Related U.S. Application Data

(60) Provisional application No. 62/674,430, filed on May 21, 2018.

(51) Int. Cl.
    *H04N 13/128* (2018.01)
    *H04N 13/271* (2018.01)
    *G06T 7/521* (2017.01)
    *G06T 7/593* (2017.01)
    *G06K 9/32* (2006.01)

(52) U.S. Cl.
    CPC ......... *H04N 13/128* (2018.05); *G06K 9/3233* (2013.01); *G06T 7/521* (2017.01); *G06T 7/593* (2017.01); *H04N 13/271* (2018.05)

(58) Field of Classification Search
    CPC combination set(s) only.
    See application file for complete search history.

(56) References Cited

U.S. PATENT DOCUMENTS

| | | | |
|---|---|---|---|
| 9,165,211 B2 | 10/2015 | Rhee et al. | |
| 10,250,871 B2 * | 4/2019 | Ciurea | G06T 5/006 |
| 10,360,462 B2 | 7/2019 | Koishi et al. | |
| 10,362,296 B2 * | 7/2019 | Price | H04N 13/111 |
| 10,424,073 B2 | 9/2019 | Karino | |

(Continued)

OTHER PUBLICATIONS

United States Office Action, U.S. Appl. No. 16/417,872, dated Oct. 26, 2020, nine pages.

*Primary Examiner* — Tsung Yin Tsai
(74) *Attorney, Agent, or Firm* — Fenwick & West LLP

(57) ABSTRACT

A depth camera assembly (DCA) determines depth information within a local area. The DCA may selectively process a subset of data captured by an imaging sensor and obtained from the imaging sensor, such as pixels corresponding to a region of interest, for depth information. Alternatively, the DCA may limit retrieval of data from the imaging sensor to pixels corresponding to the region of interest from the imaging sensor for processing for depth information. The depth processing may include a semi-global match (SGM) algorithm, and the DCA adjusts a number of neighboring pixels used for determining depth information for a specific pixel based on one or more criteria. In some embodiments, the DCA performs the depth processing by analyzing images from different image sensors using left to right and right to left correspondence checks that are performed in parallel.

14 Claims, 8 Drawing Sheets

(56) References Cited

U.S. PATENT DOCUMENTS

| | | |
|---|---|---|
| 10,708,577 B2 * | 7/2020 | Trail .................. G06F 3/011 |
| 2002/0080998 A1 | 6/2002 | Matsukawa et al. |
| 2006/0280360 A1 | 12/2006 | Holub |
| 2009/0129667 A1 | 5/2009 | Ho et al. |
| 2009/0244263 A1 | 10/2009 | Saito |
| 2010/0142852 A1 | 6/2010 | Fujita et al. |
| 2010/0246896 A1 | 9/2010 | Saito |
| 2011/0285826 A1 | 11/2011 | Bickerstaff et al. |
| 2013/0010073 A1 | 1/2013 | Do et al. |
| 2013/0141575 A1 | 6/2013 | Lee et al. |
| 2013/0169800 A1 | 7/2013 | Mori |
| 2014/0002612 A1 | 1/2014 | Morioka et al. |
| 2014/0003704 A1 | 1/2014 | Liao et al. |
| 2014/0028804 A1 | 1/2014 | Usuda et al. |
| 2014/0286536 A1 | 9/2014 | Pettersson et al. |
| 2015/0062166 A1 | 3/2015 | Pan et al. |
| 2015/0145963 A1 | 5/2015 | Oshima et al. |
| 2015/0193657 A1 * | 7/2015 | Gurman .................. G06F 3/017 345/156 |
| 2015/0193965 A1 | 7/2015 | Chen et al. |
| 2015/0206313 A1 * | 7/2015 | Reif .................. G06F 3/017 382/103 |
| 2016/0078798 A1 | 3/2016 | Watanabe et al. |
| 2016/0241774 A1 | 8/2016 | Mochizuki |
| 2016/0304098 A1 | 10/2016 | Ito et al. |
| 2016/0373714 A1 | 12/2016 | Lee et al. |
| 2017/0127048 A1 | 5/2017 | Nobayashi et al. |
| 2017/0214845 A1 | 7/2017 | Ohara |
| 2017/0244960 A1 * | 8/2017 | Ciurea .................. H04N 5/247 |
| 2018/0061070 A1 | 3/2018 | Higuchi et al. |
| 2018/0165528 A1 | 6/2018 | Koishi et al. |
| 2018/0262744 A1 | 9/2018 | Tadi et al. |
| 2018/0357775 A1 | 12/2018 | Wang et al. |
| 2019/0026921 A1 | 1/2019 | Murayama et al. |
| 2019/0058859 A1 * | 2/2019 | Price .................. H04N 13/111 |
| 2019/0087674 A1 | 3/2019 | Gao et al. |
| 2019/0259163 A1 | 8/2019 | Mao et al. |
| 2020/0193636 A1 | 6/2020 | Yang |
| 2020/0226776 A1 | 7/2020 | Toma et al. |

* cited by examiner

600

| Physical Space ID 605 | Space Configuration ID 610 | Set of Parameters 615 |
|---|---|---|
| S1 | S1C1 | {P11} |
| | S1C2 | {P12} |
| | ⋮ | ⋮ |
| | S1Cp | {P1p} |
| S2 | S2C1 | {P21} |
| | S2C2 | {P22} |
| | ⋮ | ⋮ |
| | S2Cq | {P2q} |
| ⋮ | ⋮ | ⋮ |
| Sn | SnC1 | {Pn1} |
| | SnC2 | {Pn2} |
| | ⋮ | ⋮ |
| | SnCr | {Pnr} |

FIG. 6

SELECTIVE PROCESSING OR READOUT OF DATA FROM ONE OR MORE IMAGING SENSORS INCLUDED IN A DEPTH CAMERA ASSEMBLY

CROSS-REFERENCE TO RELATED APPLICATION

This application claims the benefit of U.S. Provisional Application Ser. No. 62/674,430, filed on May 21, 2018, which is hereby incorporated by reference in its entirety.

BACKGROUND

This present disclosure generally relates to depth estimation from image data, and more specifically in the context of a headset.

Headsets in an artificial reality system often include or are paired with depth estimation systems that may determine depth information of environments of the artificial reality system. Conventional manners of determining depth information rely on detection and ranging sensors, such as ones that use radio waves, light beams, or sound waves to determine distance between the headset and objects in a local area surrounding the headset. For example, many headsets use LIDAR to determine distances to objects in a local area surrounding the headset. However, LIDAR implementations often require a column of light emitters that is rotated to generate a depth map of a local area, which is difficult to implement in a headset.

Additionally, increasing resolutions of cameras has increased proliferation of three-dimensional vision systems. In a three-dimensional vision system, images of an object or local area are captured by multiple cameras. The captured images are provided to a computing device, which analyzes the images to generate a three-dimensional graphical reconstruction of the object or local area.

However, combining images of different views of an object to generate the three-dimensional graphical reconstruction of the object or the local area is computationally intensive. This use of computational resources increases the time to generate the graphical reconstruction of the object or of the local area. Increased time to generate the graphical reconstruction of the object limits potential use of three-dimensional vision systems to implementations that are tolerant of delays from image capture to generation of graphical reconstructions of objects and to implementations having significant consumption of power and of computational resources.

SUMMARY

A depth camera assembly (DCA) determines depth information within a local area. The DCA includes at least two imaging devices that each include an imaging sensor and a controller. The controller is coupled to each of the imaging sensors, which are configured to allow the controller to identify specific pixels, or groups of pixels, in each imaging sensor. For example, the imaging sensors are digital pixel sensors.

The controller of the DCA may selectively process a subset of data captured by an imaging sensor and obtained from the imaging sensor, such as pixels corresponding to a region of interest, for depth information. For example, the controller identifies a region of interest within an image captured by an imaging device of a local area and apply one or more stereo imaging processes, also referred to as "stereo processes," to a subset of pixels corresponding to the region of interest, while differently applying (or not applying) the stereo processes to pixels that do not correspond to the region of interest. Alternatively, the controller limits retrieval of data from the imaging sensor to pixels corresponding to the region of interest from the imaging sensor for processing for depth information. The controller may identify a region of interest within a captured image from prior information about the local area captured by the image, where the prior information may be obtained from a mapping server that communicates with the DCA or from prior images of the local area previously captured by the imaging devices. This selective retrieval or processing of data from a subset of pixels allows the controller to reduce power consumption by the DCA, as well as reduce bandwidth for communication between the imaging sensors and the controller, without impairing determination of depth information for the local area by the DCA.

One or more of the stereo processes applied to data from imaging sensors by the controller may include a semi-global match (SGM) process. In the SGM process, depth information determined for neighboring pixels is used to determine information for a target pixel. For example, the SGM process uses depth information for each of eight pixels adjacent to the target pixel to determine depth information for the target pixel. To further reduce computing resources, the controller modifies a number of pixels neighboring the target pixel for which depth information is used when determining depth information for the target pixel. The controller may use various criteria when modifying a number of neighboring pixels used to determine depth information for a target pixel. For example, the controller reduces a number of neighboring pixels for which depth information is used to determine depth information for a target pixel based on contrast or texture within a region of the image including the target pixel; in various embodiments, depth information for fewer neighboring pixels is used to determine depth information for a target pixel in a portion of the image having a relatively higher local texture or local contrast than other portions of the image (or in a portion of the image having at least a threshold local texture or a threshold local contrast). As another example, the controller increases a number of neighboring pixels for which depth information is used to determine depth information for the target pixel when the target pixel is in a region of interest and uses depth information for fewer neighboring pixels when the target pixel is not in a region of interest.

Additionally, when performing depth processing on images captured by different imaging sensors, the controller generates disparity mappings for images captured by different image sensors at a common time. In various embodiments, the controller uses a left to right disparity search using an image captured by an imaging device as a baseline image for comparison with a corresponding image captured by another imaging device to determine a disparity mapping and uses a right to left disparity search using the image captured by the other imaging device as a baseline image for comparison with a corresponding image captured by imaging device to determine an additional disparity mapping. To conserve power and computational resources, the controller performs the left to right disparity search and the right to left disparity search in parallel and compares intermediate values, such as confidence values for disparities determined for different pixels, determined during the left to right disparity check and during the right to left disparity check to evaluate depth information determined from the images captured by different imaging devices.

BRIEF DESCRIPTION OF THE DRAWINGS

FIG. 6 is an example of a virtual model describing local areas surrounding a headset and parameters describing configuration of the local areas surrounding the headset, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereoscopic, or "stereo," video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a headset, a head-mounted display (HMD) connected to a host computer system, a standalone HMD, a near-eye display (NED), a mobile device or computing system, or any other hardware platform capable of providing artificial reality content to one or more viewers.

System Environment

Figure 1:
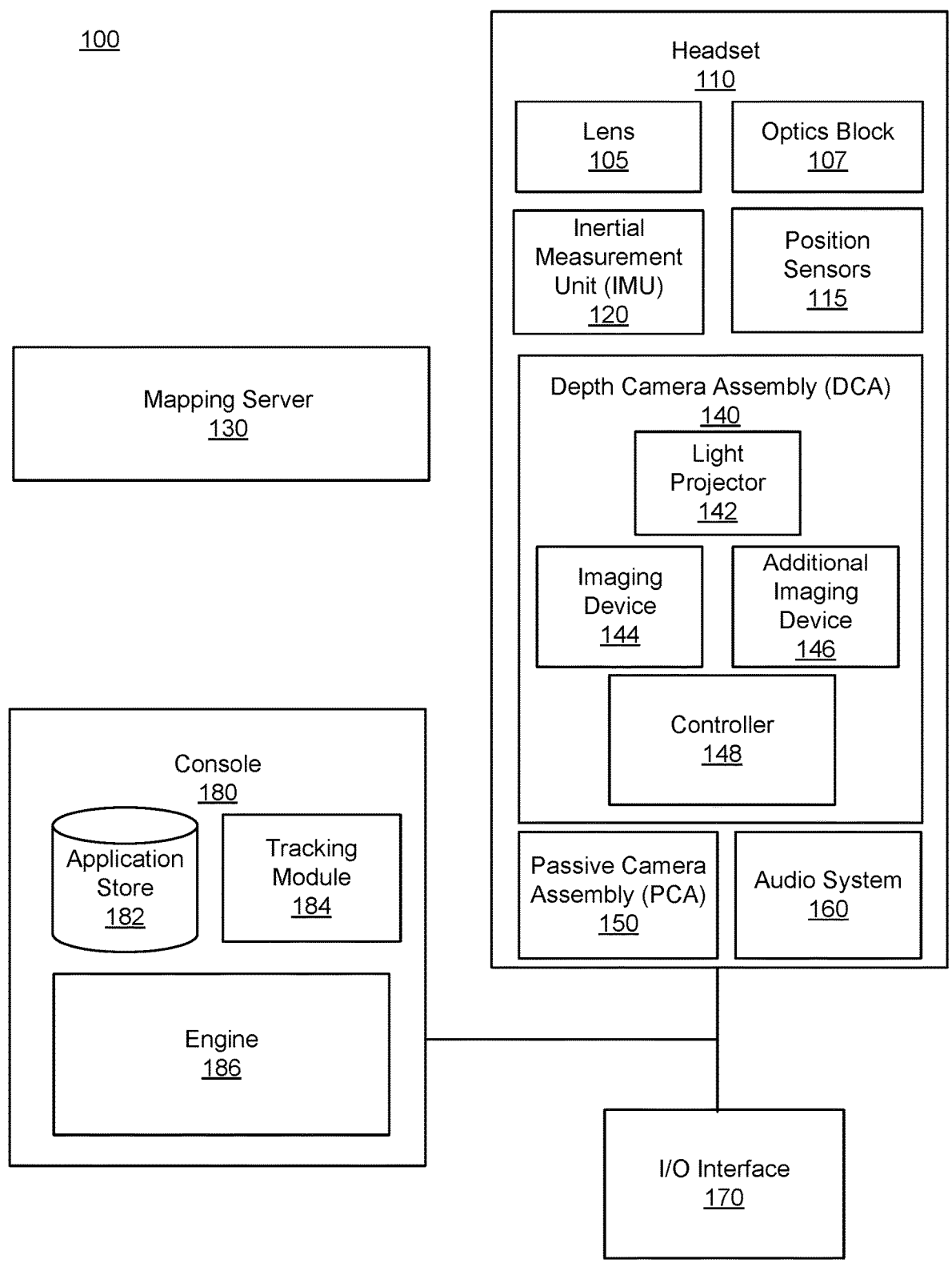
FIG. 1 is a block diagram of a system environment of a headset, in accordance with one or more embodiments.

FIG. 1 is a block diagram of one embodiment of a system environment 100 of a headset 110. The system environment 100 may operate in an artificial reality environment, e.g., a virtual reality, an augmented reality, a mixed reality environment, or some combination thereof. The system 100 environment shown by FIG. 1 includes the headset 110, a mapping server 130 and an input/output (I/O) interface 170 that is coupled to a console 180. While FIG. 1 shows an example system environment 100 including one headset 110 and one I/O interface 180, in other embodiments any number of these components may be included in the system environment 100. For example, there may be multiple headsets 110 each having an associated I/O interface 170, with each headset 110 and I/O interface 170 communicating with the console 180. In alternative configurations, different and/or additional components may be included in the system environment 100. Additionally, functionality described in conjunction with one or more of the components shown in FIG. 1 may be distributed among the components in a different manner than described in conjunction with FIG. 1 in some embodiments. For example, some or all of the functionality of the console 180 may be provided by the headset 110.

The headset 110 includes a lens 105, an optics block 107, one or more position sensors 115, an inertial measurement unit (IMU) 120, a depth camera assembly (DCA) 140 a passive camera assembly (PCA) 150, and an audio system 160. Some embodiments of the headset 110 have different components than those described in conjunction with FIG. 1. Additionally, the functionality provided by various components described in conjunction with FIG. 1 may be differently distributed among the components of the headset 110 in other embodiments, or be captured in separate assemblies remote from the headset 110.

The lens 105 may include an electronic display that displays 2D or 3D images to the user in accordance with data received from the console 180. In various embodiments, the lens 105 comprises a single electronic display or multiple electronic displays (e.g., a display for each eye of a user). Examples of an electronic display include: a liquid crystal display (LCD), an organic light emitting diode (OLED) display, an active-matrix organic light-emitting diode display (AMOLED), some other display, or some combination thereof.

The optics block 107 magnifies image light received from the electronic display, corrects optical errors associated with the image light, and presents the corrected image light to a user of the headset 110. In various embodiments, the optics block 107 includes one or more optical elements. Example optical elements included in the optics block 107 include: an aperture, a Fresnel lens, a convex lens, a concave lens, a filter, a reflecting surface, or any other suitable optical element that affects image light. Moreover, the optics block 107 may include combinations of different optical elements. In some embodiments, one or more of the optical elements in the optics block 107 may have one or more coatings, such as partially reflective or anti-reflective coatings.

Magnification and focusing of the image light by the optics block 107 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 107 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 107 corrects the distortion when it receives image light from the electronic display generated based on the content.

The IMU 120 is an electronic device that generates data indicating a position of the headset 110 based on measurement signals received from one or more of the position sensors 115. A position sensor 115 generates one or more measurement signals in response to motion of the headset 110. Examples of position sensors 115 include: one or more accelerometers, one or more gyroscopes, one or more magnetometers, another suitable type of sensor that detects motion, a type of sensor used for error correction of the IMU 120, or some combination thereof. The position sensors 115 may be located external to the IMU 120, internal to the IMU 120, or some combination thereof.

The DCA 140 generates depth image data of a local area, such as a room. Depth image data includes pixel values defining distance from the DCA 140, providing a mapping of locations captured in the depth image data, such as a three-dimensional mapping of locations captured in the depth image data. The DCA 140 includes a light projector 142, a plurality of imaging devices—the imaging device 144 and the additional imaging device 146—and controller 148. The light projector 142 may project a structured light pattern or other light that is reflected off objects in the local area, and captured by the imaging device 144 or by the additional imaging device 146 to generate the depth image data.

For example, the light projector 142 may project a plurality of structured light (SL) elements of different types (e.g. lines, grids, or dots) onto a portion of a local area surrounding the headset 110. In various embodiments, the light projector 142 comprises an emitter and a pattern plate. The emitter is configured to illuminate the pattern plate with light (e.g., infrared light). The illuminated pattern plate projects a structured light (SL_pattern comprising a plurality of SL elements into the local area. For example, each of the SL elements projected by the illuminated pattern plate is a dot associated with a particular location on the pattern plate.

Each SL element projected by the DCA 140 comprises light in the infrared light part of the electromagnetic spectrum. In some embodiments, the illumination source is a laser configured to illuminate a pattern plate with infrared light such that it is invisible to a human. In some embodiments, the illumination source may be pulsed. In some embodiments, the illumination source may be visible and pulsed such that the light is not visible to the eye.

The SL pattern projected into the local area by the DCA 140 deforms as it encounters various surfaces and objects in the local area. The imaging device 144 and the additional imaging device 146 are each configured to capture one or more images of the local area. Each of the one or more images captured may include a plurality of SL elements (e.g., dots) projected by the light projector 142 and reflected by the objects in the local area. The imaging device 144 and the additional imaging device 146 may be a detector array, a camera, or a video camera. While FIG. 1 shows the DCA 120 including two imaging devices, in various embodiments, the DCA 120 includes a greater number of imaging devices.

Figure 3:
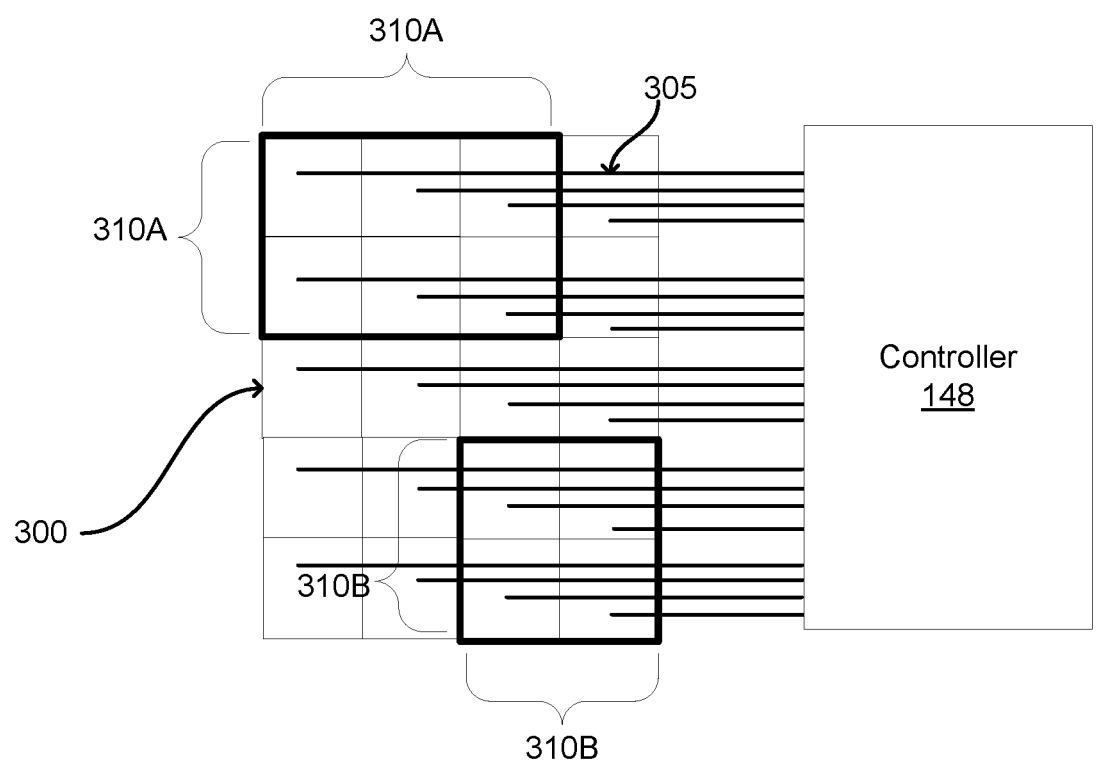
FIG. 3 is an example imaging sensor included in an imaging device of a depth camera assembly of a headset, in accordance with one or more embodiments.

The imaging device 144 and the additional imaging device 146 each include an imaging sensor, such as the imaging sensor further described below in conjunction with FIG. 3. The imaging device 144 and the additional imaging device 146 are separated by a baseline distance; for example, the imaging device 144 and the additional imaging device 146 are positioned on different sides of the headset 110, with a known distance separating the imaging device 144 and the additional imaging device 146. In various embodiments the imaging device 144 and the additional imaging device 146 include a complementary metal oxide semiconductor (CMOS) sensor. The imaging sensor of the imaging device 144 or of the additional imaging device 146 may detect visible light, infrared light, or a combination of visible light and infrared light. For example, an imaging sensor of the imaging device 144 or of the additional imaging device 146 includes a color filter array, so different pixels of the imaging sensor capture different wavelengths of light. In other embodiments, an imaging sensor of the imaging device 144 or of the additional imaging device 146 comprises an array of stacked infrared and color (e.g., red, blue, green) photodiodes, where an upper substrate of the sensor includes a pixel array detecting visible light (e.g., red, blue, and green light) and a lower substrate includes a second pixel array for detecting infrared light that passes through the upper substrate. Additionally, as shown in FIG. 3, specific pixels, or specific groups of pixels, may be identified by the controller 148, allowing the controller 148 to selectively obtain data or values from specific pixels of the sensor.

The controller 148 generates the depth image data based on light captured by the imaging device 144 and by the additional imaging device 148. The controller 148 may further provide the depth image data to the console 180, the audio system 160, or some other component. In various embodiments, the controller 148 determines depth information for each pixel of an image based on images captured by the imaging device 144 and by the additional imaging device 146 and stores the depth information for each pixel in association with the pixel to generate the depth image. In various embodiments, the controller 148 applies one or more stereo imaging, also referred to as "stereo," processes to a pair of images captured by the imaging device 144 and by the additional imaging device 146 at a common time to determine depth information. Example stereo processes include global patch matching and semi-global matching. When the controller 148 applies a semi-global matching process, the controller 148 performs dense patch matching over a subset of an image captured by the imaging device 144 and a subset of an additional image captured by the additional imaging device 146 at a common time as the image; for example, the controller 148 rectifies the image and the additional image and performs dense patch matching along epipolar lines between the rectified image and additional image. When applying the semi-global matching process, the controller 148 also propagates depth information for a pixel to other pixels along a finite number of paths (e.g., 4, 8, 16) across an image. However, in other embodiments, the controller 148 implements any suitable stereo process, such as via a convolutional neural network.

As further described below in conjunction with FIGS. 4-9, the controller 148 may modify processing of information from the imaging device 144 and from the additional imaging device 146 based on one or more criteria. For example, the controller 148 differently processes data from different pixels of an imaging sensor of the imaging device 144 or of the additional imaging device 148. As further described below in conjunction with FIG. 4, the controller 148 may obtain values from a subset of pixels of a sensor, while not obtaining values from other pixels of the sensor; alternatively, the controller 148 may apply a stereo process to data from a subset of pixels of the sensor, while not applying (or differently applying) the stereo process to data from pixels not in the subset of pixels. As further described below in conjunction with FIG. 7, the controller 148 may also modify propagation of depth information between pixels of an image based on information about the local area. The controller 148 may also perform disparity checks between images captured by the imaging device 144 and by the additional imaging device 146, as further described below in conjunction with FIG. 9. The selective processing and adjustment of processing by the controller 148 further described below reduces power consumption of the DCA 140 and bandwidth used for communicating information between components of the DCA 140.

The PCA 150 includes one or more passive cameras that generate color (e.g., RGB) image data. Unlike the DCA 140 that uses active light emission and reflection, the PCA 150 captures light from the environment of a local area to generate image data. Rather than pixel values defining depth or distance from the imaging device, the pixel values of the image data may define the visible color of objects captured in the imaging data. In some embodiments, the PCA 150 includes a controller that generates the color image data based on light captured by the passive imaging device. In some embodiments, the DCA 140 and the PCA 150 share a common controller. For example, the common controller may map each of the one or more images captured in the visible spectrum (e.g., image data) and in the infrared spectrum (e.g., depth image data) to each other. In one or more embodiments, the common controller is configured to, additionally or alternatively, provide the one or more images of the local area to the audio system 160, to the console 180, or to any other suitable components.

The audio system 160 presents audio content to a user of the headset 110 using a set of acoustic parameters representing an acoustic property of a local area where the headset 110 is located. The audio system 160 presents the audio content to appear originating from an object (e.g., virtual object or real object) within the local area. The audio system 160 may obtain information describing at least a portion of the local area. In some embodiments, the audio system 160 may communicate the information to the mapping server 130 for determination of the set of acoustic parameters at the mapping server 130. The audio system 160 may also receive the set of acoustic parameters from the mapping server 130.

In some embodiments, the audio system 160 selectively extrapolates the set of acoustic parameters into an adjusted set of acoustic parameters representing a reconstructed impulse response for a specific configuration of the local area, responsive to a change of an acoustic condition of the local area being above a threshold change. The audio system 160 may present audio content to the user of the headset 110 based at least in part on the reconstructed impulse response.

In some embodiments, the audio system 160 monitors sound in the local area and generates a corresponding audio stream. The audio system 160 may adjust the set of acoustic parameters, based at least in part on the audio stream. The audio system 160 may also selectively communicate the audio stream to the mapping server 130 for updating a virtual model describing a variety of physical spaces and acoustic properties of those spaces, responsive to determination that a change of an acoustic property of the local area over time is above a threshold change. The audio system 160 of the headset 110 and the mapping server 130 may communicate via a wired or wireless communication channel.

The I/O interface 170 is a device that allows a user to send action requests and receive responses from the console 180. An action request is a request to perform a particular action. For example, an action request may be an instruction to start or end capture of image or video data, or an instruction to perform a particular action within an application. The I/O interface 170 may include one or more input devices. Example input devices include: a keyboard, a mouse, a game controller, or any other suitable device for receiving action requests and communicating the action requests to the console 180. An action request received by the I/O interface 170 is communicated to the console 180, which performs an action corresponding to the action request. In some embodiments, the I/O interface 170 includes the IMU 120, as further described above, that captures calibration data indicating an estimated position of the I/O interface 170 relative to an initial position of the I/O interface 170. In some embodiments, the I/O interface 170 may provide haptic feedback to the user in accordance with instructions received from the console 180. For example, haptic feedback is provided when an action request is received, or the console 180 communicates instructions to the I/O interface 170 causing the I/O interface 170 to generate haptic feedback when the console 180 performs an action.

The console 180 provides content to the headset 110 for processing in accordance with information received from one or more of: the DCA 140, the PCA 150, the headset 110, and the I/O interface 170. In the example shown in FIG. 1, the console 180 includes an application store 182, a tracking module 184, and an engine 186. Some embodiments of the console 180 have different modules or components than those described in conjunction with FIG. 1. Similarly, the functions further described below may be distributed among components of the console 180 in a different manner than described in conjunction with FIG. 1. In some embodiments, the functionality discussed herein with respect to the console 180 may be implemented in the headset 110, or a remote system.

The application store 182 stores one or more applications for execution by the console 180. An application is a group of instructions, that when executed by a processor, generates content for presentation to the user. Content generated by an application may be in response to inputs received from the user via movement of the headset 110 or the I/O interface 170. Examples of applications include: gaming applications, conferencing applications, video playback applications, or other suitable applications.

The tracking module 184 calibrates the local area of the system environment 100 using one or more calibration parameters and may adjust one or more calibration parameters to reduce error in determination of the position of the headset 110 or of the I/O interface 170. For example, the tracking module 184 communicates a calibration parameter to the DCA 140 to adjust the focus of the DCA 140 to more accurately determine positions of SL elements captured by the DCA 140. Calibration performed by the tracking module 184 also accounts for information received from the IMU 120 in the headset 110 and/or an IMU 120 included in the I/O interface 640. Additionally, if tracking of the headset 110 is lost (e.g., the DCA 140 loses line of sight of at least a threshold number of the projected SL elements), the tracking module 184 may re-calibrate some or all of the system environment 100.

The tracking module 184 tracks movements of the headset 110 or of the I/O interface 170 using information from the DCA 140, the PCA 150, the one or more position sensors 115, the IMU 120 or some combination thereof. For example, the tracking module 184 determines a position of a reference point of the headset 110 in a mapping of a local area based on information from the headset 110. The tracking module 184 may also determine positions of an object or virtual object. Additionally, in some embodiments, the tracking module 184 may use portions of data indicating a position of the headset 110 from the IMU 120 as well as representations of the local area from the DCA 140 to predict a future location of the headset 110. The tracking module 184 provides the estimated or predicted future position of the headset 110 or the I/O interface 170 to the engine 186.

The engine 186 executes applications and receives position information, acceleration information, velocity information, predicted future positions, or some combination thereof, of the headset 110 from the tracking module 184. Based on the received information, the engine 186 determines content to provide to the headset 110 for presentation to the user. For example, if the received information indicates that the user has looked to the left, the engine 186 generates content for the headset 110 that mirrors the user's movement in a virtual local area or in a local area augmenting the local area with additional content. Additionally, the engine 186 performs an action within an application executing on the console 180 in response to an action request received from the I/O interface 170 and provides feedback to the user that the action was performed. The provided feedback may be visual or audible feedback via the headset 110 or haptic feedback via the I/O interface 170.

Headset

Figure 2:
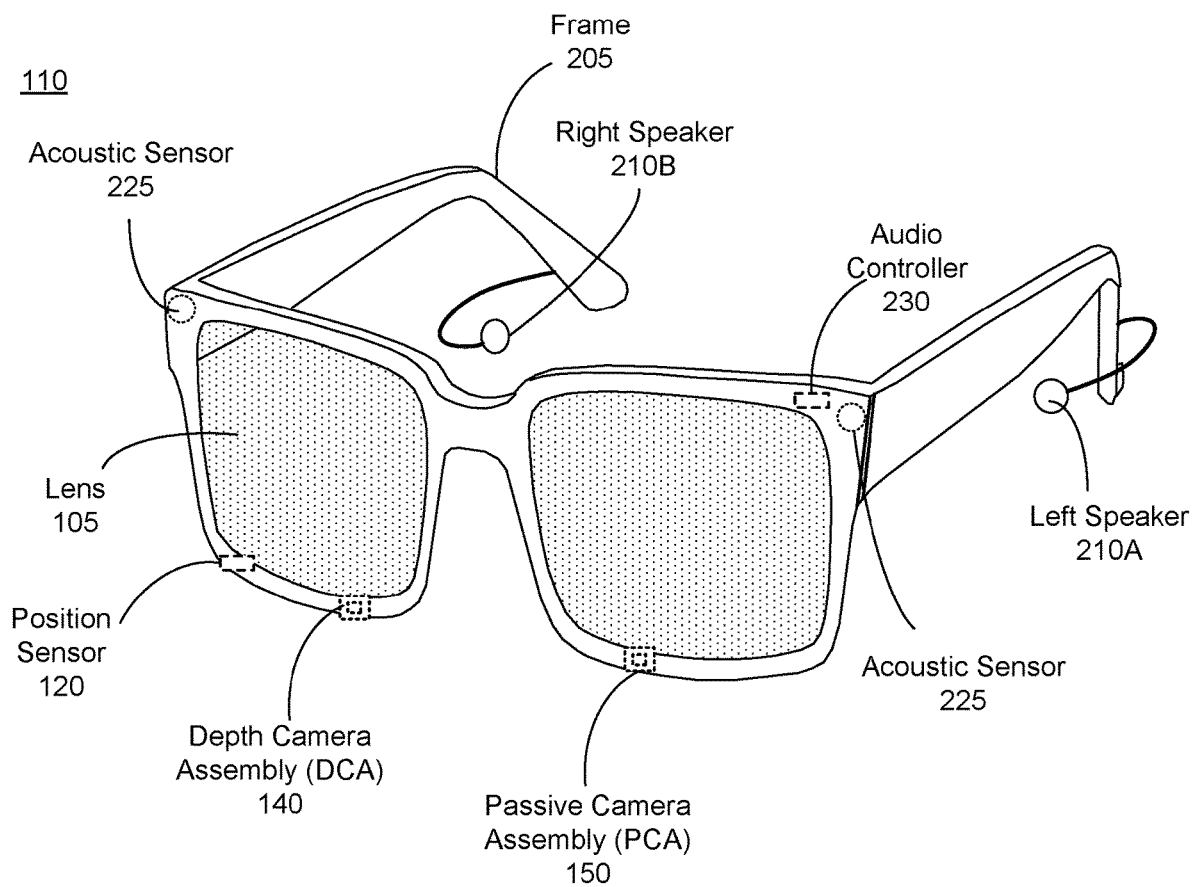
FIG. 2 is a perspective view of the headset, in accordance with one or more embodiments.

FIG. 2 is a perspective view of the headset 110, in accordance with one or more embodiments. In some embodiments (as shown in FIG. 1), the headset 110 is implemented as a NED. In alternate embodiments (not shown in FIG. 1), the headset 100 is implemented as an HMD. In general, the headset 110 may be worn on the face of a user such that content (e.g., media content) is presented using one or both lenses 105 of the headset 110. However, the headset 110 may also be used such that media content is presented to a user in a different manner. Examples of media content presented by the headset 110 include one or more images, video, audio, or some combination thereof. The headset 110 may include, among other components, a frame 205, a lens 105, a DCA 140, a PCA 150, a position sensor 115, and an audio system 160. The audio system of the headset 110 shown in FIG. 2 includes a left binaural microphone 210a, a right binaural microphone 210b, an array of acoustic sensors 225, an audio controller 230, one or more other components, or combination thereof. The audio system of the headset 110 is an embodiment of the audio system 160 described above in conjunction with FIG. 1. The DCA 140 and the PCA 150 may be part of SLAM sensors mounted the headset 110 for capturing visual information of a local area surrounding some or all of the headset 110. While FIG. 2 illustrates the components of the headset 110 in example locations on the headset 110, the components may be located elsewhere on the headset 110, on a peripheral device paired with the headset 110, or some combination thereof.

The headset 110 may correct or enhance the vision of a user, protect the eye of a user, or provide images to a user. The headset 110 may be eyeglasses which correct for defects in a user's eyesight. The headset 110 may be sunglasses which protect a user's eye from the sun. The headset 110 may be safety glasses which protect a user's eye from impact. The headset 110 may be a night vision device or infrared goggles to enhance a user's vision at night. The headset 110 may be a near-eye display that produces artificial reality content for the user.

The frame 205 holds the other components of the headset 110. The frame 205 includes a front part that holds the lens 105 and end pieces to attach to a head of the user. The front part of the frame 205 bridges the top of a nose of the user. The end pieces (e.g., temples) are portions of the frame 205 to which the temples of a user are attached. The length of the end piece may be adjustable (e.g., adjustable temple length) to fit different users. The end piece may also include a portion that curls behind the ear of the user (e.g., temple tip, ear piece).

The lens 105 provides or transmits light to a user wearing the headset 110. The lens 105 may be prescription lens (e.g., single vision, bifocal and trifocal, or progressive) to help correct for defects in a user's eyesight. The prescription lens transmits ambient light to the user wearing the headset 110. The transmitted ambient light may be altered by the prescription lens to correct for defects in the user's eyesight. The lens 105 may be a polarized lens or a tinted lens to protect the user's eyes from the sun. The lens 105 may be one or more waveguides as part of a waveguide display in which image light is coupled through an end or edge of the waveguide to the eye of the user. The lens 105 may include an electronic display for providing image light and may also include an optics block for magnifying image light from the electronic display, as further described above in conjunction with FIG. 1.

The DCA 140 captures depth image data describing depth information for a local area surrounding the headset 110, such as a room. In some embodiments, the DCA 140 may include a light projector 142 (e.g., structured light and/or flash illumination for time-of-flight), a plurality of imaging devices (e.g., the imaging device 144 and the additional imaging device 146 in FIG. 1) plurality, and a controller 148, as described above in conjunction with FIG. 1. The captured data may be images captured by the imaging device of light projected onto the local area by the light projector. In one embodiment, the DCA 140 may include a controller and two or more imaging devices (e.g., cameras) that are oriented to capture portions of the local area in stereo. The captured data may be images captured by the two or more imaging devices of the local area in stereo. The controller of the DCA 140 computes the depth information of the local area using the captured data and depth determination techniques (e.g., structured light, time-of-flight, stereo imaging, etc.). Based on the depth information, the controller 148 of the DCA 140 determines absolute positional information of the headset 110 within the local area. The controller 148 of the DCA 140 may also generate a model of the local area. The DCA 140 may be integrated with the headset 110 or may be positioned within the local area external to the headset 110. In some embodiments, the controller 148 of the DCA 140 may transmit the depth image data to the mapping server 130 via a network or other communication channel.

The PCA 150 includes one or more passive cameras that generate color (e.g., RGB) image data. Unlike the DCA 140 that uses active light emission and reflection, the PCA 150 captures light from the environment of a local area to generate color image data. Rather than pixel values defining depth or distance from the imaging device, pixel values of the color image data may define visible colors of objects captured in the image data. In some embodiments, the PCA 150 includes a controller that generates the color image data based on light captured by the passive imaging device. The PCA 150 may provide the color image data to the controller 148 of the DCA 140 for further processing or for communication to the mapping server 130.

The array of acoustic sensors 225 monitor and record sound in a local area surrounding some or all of the headset 110. As illustrated in FIG. 2, the array of acoustic sensors 225 include multiple acoustic sensors with multiple acoustic detection locations that are positioned on the headset 110. The array of acoustic sensors 225 may provide the recorded sound as an audio stream to the audio controller 230.

The position sensor 115 generates one or more measurement signals in response to motion of the headset 110. The position sensor 115 may be located on a portion of the frame 205 of the headset 110. The position sensor 115 may include a position sensor, an inertial measurement unit (IMU), or both. Some embodiments of the headset 110 may or may not include the position sensor 115 or may include more than one position sensors 115. In embodiments in which the position sensor 115 includes an IMU, the IMU generates IMU data based on measurement signals from the position sensor 115. Examples of position sensor 115 include: one or more accelerometers, one or more gyroscopes, one or more magnetometers, another suitable type of sensor that detects motion, a type of sensor used for error correction of the IMU, or some combination thereof. The position sensor 115 may be located external to the IMU, internal to the IMU, or some combination thereof.

Based on the one or more measurement signals, the position sensor 115 estimates a current position of the headset 110 relative to an initial position of the headset 110. The estimated position may include a location of the headset 110 and/or an orientation of the headset 110 or the user's head wearing the headset 110, or some combination thereof. The orientation may correspond to a position of each ear relative to a reference point. In some embodiments, the position sensor 115 uses the depth information and/or the absolute positional information from the DCA 140 to estimate the current position of the headset 110. The position sensor 115 may include multiple accelerometers to measure translational motion (forward/back, up/down, left/right) and multiple gyroscopes to measure rotational motion (e.g., pitch, yaw, roll). In some embodiments, an IMU, further described above in conjunction with FIG. 1, rapidly samples the measurement signals and calculates the estimated position of the headset 110 from the sampled data. For example, the IMU integrates the measurement signals received from the accelerometers over time to estimate a velocity vector and integrates the velocity vector over time to determine an estimated position of a reference point on the headset 110. The reference point is a point that may be used to describe the position of the headset 110. While the reference point may generally be defined as a point in space, however, in practice the reference point is defined as a point within the headset 110.

The audio controller 230 provides audio instructions to one or more speakers for generating sound by generating audio content using a set of acoustic parameters (e.g., a room impulse response). The audio controller 230 presents the audio content to appear originating from an object (e.g., virtual object or real object) within the local area, e.g., by transforming a source audio signal using the set of acoustic parameters for a current configuration of the local area. The audio controller 230 receives information describing a sound pressure in an ear canals of the user when speakers of the headset 110 are presenting audio data to the user from binaural microphone 210A and binaural microphone 210B. Based on the information from the binaural microphones 210A, 210B the audio controller 2230 calibrates one or more speakers, which receive audio instructions from the audio controller 230 to generate sounds. For example, a left speaker obtains a left audio channel from the audio controller 230, and a right speaker obtains and a right audio channel from the audio controller 230. In various embodiments, each speaker is coupled to an end piece of the frame 205, although in other embodiments the speakers, or a speaker array, are integrated into the frame 205 (e.g., in temples of the frame 205) to improve directionality of presented audio content.

The audio controller 230 may obtain visual information describing at least a portion of the local area, e.g., from the DCA 140 and/or the PCA 150. The visual information obtained at the audio controller 230 may include depth image data captured by the DCA 140. The visual information obtained at the audio controller 230 may further include color image data captured by the PCA 150. The audio controller 230 may combine the depth image data with the color image data into the visual information that is communicated (e.g., via a communication module coupled to the audio controller 230, not shown in FIG. 2) to the mapping server 130 for determination of a set of acoustic parameters. In one embodiment, the communication module (e.g., a transceiver) may be integrated into the audio controller 230. In another embodiment, the communication module may be external to the audio controller 230 and integrated into the frame 205 as a separate module coupled to the audio controller 230. In some embodiments, the audio controller 230 generates an audio stream based on sound in the local area monitored by, e.g., the array of acoustic sensors 225. The communication module coupled to the audio controller 420 may selectively communicate the audio stream to the mapping server 130 for updating the visual model of physical spaces at the mapping server 130.

Depth Camera Assembly Imaging Sensor

FIG. 3 is an example imaging sensor 300 included in an imaging device of the DCA 140. For example, the imaging sensor 300 described in conjunction with FIG. 3 is included in the imaging device 144 or the additional imaging device 146 of the DCA 140. The imaging sensor 300 comprises a two dimensional array of pixels 305, with each pixel 305 including a photodetector, such as a photodiode. In various embodiments, the imaging sensor 300 is a digital pixel sensor, where each pixel 305 includes a photodetector coupled to an analog to digital converter (ADC), where the ADC of the pixel 305 is coupled to a memory. The memory of the pixel 305 is coupled to readout circuitry that is coupled to the controller 148 of the DCA 140. For example, a photodiode included in a pixel 305 generates a current based on an amount of light from a local area surrounding the imaging sensor 300, and the ADC coupled to the photodiode generates a digital value from the current generated by the current. In the preceding example, the digital value generated by the ADC is stored in a memory corresponding to the pixel 305, from which the controller 148 retrieves the digital value for processing and analysis. This allows the controller 148 to selectively retrieve digital values from specific pixels 305 in the imaging sensor 300 by accessing a memory corresponding to the specific pixel 305. Hence, as shown in FIG. 3, the controller 148 may communicate with individual pixels 305 of the imaging sensor 300.

In addition to accessing individual pixels 305 of the sensor to retrieve values generated by different pixels 305 from light incident on the pixels 305, the controller 148 may transmit one or more control signals to individual pixels 305. For example, a control signal transmitted by the controller 148 to a pixel 305 determines whether an analog to digital converter (ADC) of the pixel 305 is operational. Hence, a specific value of the control signal from the controller 148 to the pixel 305 causes the ADC of the pixel 305 to be turned off (i.e., inactive), so the ADC does not generate a digital value from light incident on the pixel 305, while an alternative value of the control signal causes the ADC of the pixel to be turned on (i.e., active) to generate a digital value from light incident on the pixel 305. Hence, the controller 148 may selectively obtain digital values from specific pixels 305 of the imaging sensor 300, and not obtain digital values from other pixels 305 of the imaging sensor 300.

For purposes of illustration, FIG. 3 shows region of interest 310A and region of interest 310B on the imaging sensor 300, with region of interest 310A including a subset of pixels 305 of the imaging sensor 300 and region of interest 310B including a different subset of pixels 305 of the imaging sensor 300. In the example of FIG. 3, the controller 300 transmits control signals to each pixel 305 in region of interest 310A and to each pixel 305 in region of interest 310B to activate ADCs corresponding to each pixel 305 in region of interest 310A and to each pixel in region of interest 310B. Conversely, in the example of FIG. 3, the controller 148 transmits alternative control signals to pixels 305 that are not within region of interest 310A or within region of interest 310B that deactivates ADCs of pixels 305 that are not within region of interest 310A or region of interest 310B. In other embodiments, the controller 148 retrieves digital values generated by pixels within region of interest 310A and generated by pixels within region of interest 310B but does not retrieve digital values generated by pixels 305 that are not within region of interest 310A or within region of interest 310B. Thus, the controller 148 configures the imaging sensor 300 so a subset of pixels comprising the imaging sensor 300 generate data or retrieves data generated by a subset of pixels of the imaging sensor 300 rather than from each pixel of the imaging sensor 300. Limiting the pixels 305 for which the imaging sensor 300 outputs digital values to the controller 148 for communication between the controller 148 and an imaging device including the imaging sensor 300 and reduces power consumption by the imaging sensor 300.

In other embodiments, the controller 148 retrieves digital values from each pixel 305 of the imaging sensor 300, but applies one or more processes to digital values from specific subsets of pixels 305 rather than to digital values from each pixel 305 of the imaging sensor 300. For example, the controller 148 applies a semi-global matching process to digital values from pixels 305 of an imaging sensor 300 of the imaging device 144 and from pixels 305 of a imaging sensor 300 of the additional imaging device 146 to determine depth information from the DCA 140 to objects within a local area surrounding the DCA 140. The controller 148 identifies regions of interest 310A, 310B of the imaging sensor 300 of the imaging device 144 and applies the semi-global matching process to digital values from pixels 305 of a region of interest 310A, 310B but does not apply the semi-global matching process to digital values from pixels 305 outside the region of interest 310A, 310B. In the semi-global matching example above, the controller 148 performs dense patch matching over a subset of an image captured by the imaging device 144 along epipolar lines on rectified pairs of images captured by the imaging device 144 and by the additional imaging device 146. Hence, the controller 148 may apply the semi-global matching process to a subset of regions within an image rather than to the image captured by the imaging device 144 as a whole. Determination of regions of interest comprising pixels 305 within a imaging sensor 300 of an imaging device is further described below in conjunction with FIG. 4.

Selective Processing of Pixels of Imaging Sensor

Figure 4:
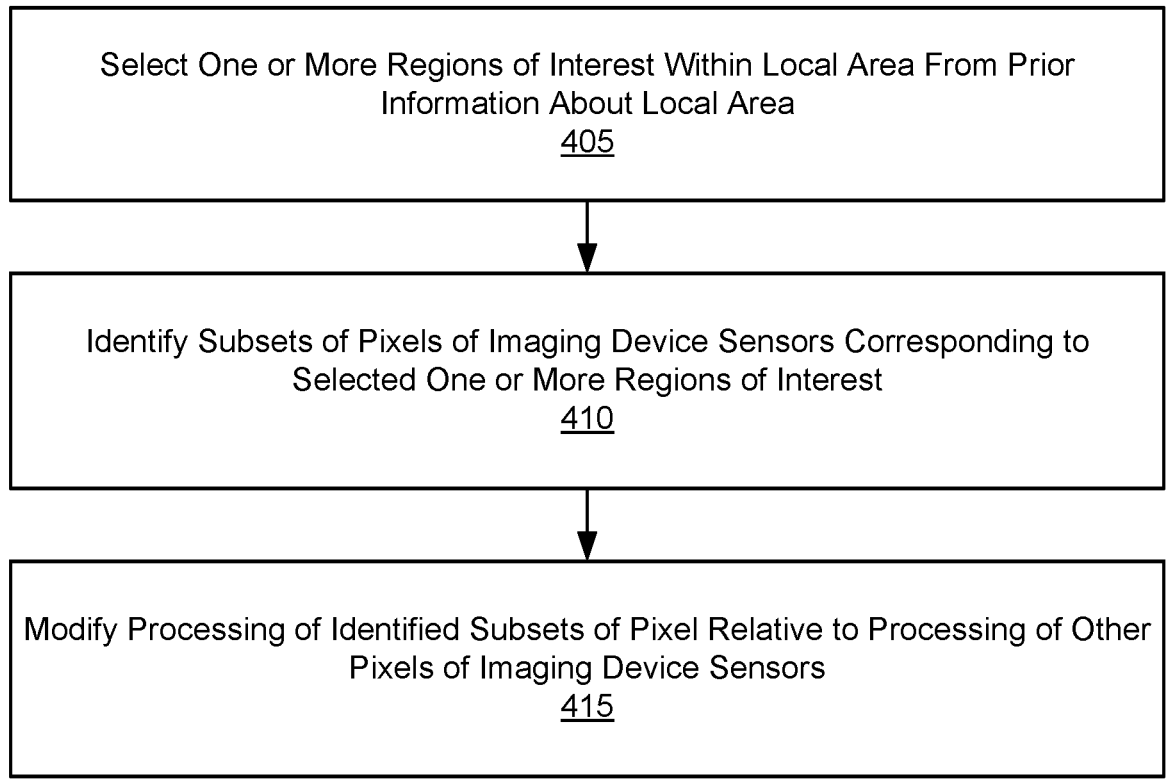
FIG. 4 is a flowchart of a method for selecting a subset of pixels of an imaging sensor of an imaging device for determining depth information, in accordance with one or more embodiments.

FIG. 4 is a flowchart of one embodiment of a method for selecting a subset of pixels of an imaging sensor 300 of an imaging device for determining depth information. In various embodiments, the method includes different steps than those described in conjunction with FIG. 4. Additionally, in various embodiments, steps of the method may be performed in a different order than the order described in conjunction with FIG. 4.

A depth camera assembly (DCA) 140 includes an imaging device 144, an additional imaging device 146, and a controller 148, as further described above in conjunction with FIG. 1. The imaging device 144 and the additional imaging device 146 each include an imaging sensor 300 comprising a two-dimensional array of pixels, as further described above in conjunction with FIG. 3. The controller 148 is communicatively coupled to the imaging sensor 300 of the imaging device 144 and to the imaging sensor 300 of the additional imaging device 146. As further described above in conjunction with FIG. 3, the imaging sensor 300 is configured so the controller 148 is capable of identifying different individual pixels 305 of the imaging sensor 300 or of identifying different sets of pixels 305 of the imaging sensor 300.

The imaging device 144 and the additional imaging device 146 capture images of a local area surrounding the DCA 140, and the controller 148 applies one or more stereo processes to images captured by the imaging device 114 and the additional imaging device 146 to determine depth information between the DCA 140 and objects within the local area of the DCA 140 and within fields of view of the imaging device 144 and the additional imaging device 146. For example, the controller 148 applies a global patch matching process to a pair of images of the local area captured by the imaging device 144 and by the additional imaging device 144. As another example, the controller 148 applies a semi global matching process to the pair of images of the local area captured by the imaging device 144 and by the additional imaging device 144. However, in other embodiments, the controller 148 applies any suitable stereo process, implemented in any suitable manner (e.g., as a convolutional neural network), to a pair of images captured by the imaging device 144 and by the additional imaging device 146.

In various embodiments, the imaging device 144 and the additional imaging device 146 capture images of the local area at multiple times. For example, the imaging device 144 and the additional imaging device 146 each capture an image of the local area at a periodic time interval. Based on prior information about the local area, the controller 148 selects 405 one or more regions of interest within the images captured by the imaging device 144 and by the additional imaging device 146 at the current time. For example, based on depth information or contrast information for different locations within the local area from images captured by the imaging device 144 and by the additional imaging device 146 at times prior to a current time, the controller 148 selects 405 one or more regions of interest within the images captured by the imaging device 144 and by the additional imaging device 146 at the current time. The controller 148 may use information about the local area determined from a set of images captured at multiple times prior to the current time or may use information about the local area determined from a pair of images captured by the imaging device 144 and by the additional imaging device 146 at a specific time prior to the current time (e.g., captured at a most recent time before the current time) when selecting 405 the one or more regions of interest in an image captured by the imaging device 144 or by the additional imaging device 146.

For example, a region of interest in an image captured by the imaging device 144 or by the additional imaging device 146 corresponds to a region within the local area where the controller 148 determines there is at least a threshold likelihood of the region within the local area being illuminated by a light projector 142 of the DCA 140 during the current time based on images captured by the imaging device 144 or by the additional imaging device 146 at one or more prior times. As another example, a region of interest in the image captured by the imaging device 144 or by the additional imaging device 146 corresponds to a region within the local area having at least a threshold likelihood of including an object (such as a virtual object or a physical object), as determined by the controller 146 from images captured by the imaging device 144 or by the additional imaging device 146 at one or more prior times or from other prior information about the local area.

In various embodiments, the controller 148 receives information describing the local area from a mapping server 130 and selects 405 one or more regions of interest in the image captured by the imaging device 144 or by the additional imaging device 146 based on the information received from the mapping server 130. For example, the information from the mapping server 130 identifies regions within the local area that previously included an object. The controller 148 selects 405 a region of interest in the image corresponding to a region identified by the information from the mapping server 130 as previously including an object. As another example, information received from the mapping server 130 identifies contrast measurements previously determined for different regions of the local area, and the controller 148 selects 405 a region of interest as a region having at least a threshold contract measurement from the information received from the mapping server 130. Hence, in various embodiments, the controller 148 selects 405 regions of interest as regions of an image corresponding to information received from the mapping server 130 having one or more specific characteristics.

The controller 148 identifies 410 a subset of pixels of an imaging sensor 300 of the imaging device 144 or of the additional imaging device 146 corresponding to each of the regions of interest identified 405 by the controller 148. The controller 148 modifies 415 processing of data from pixels of a imaging sensor 300 of the imaging device 144 or of the additional imaging device 146 that are within the subset of pixels corresponding to a region of interest relative to processing of data from pixels of the imaging sensor 300 of the imaging device 144 or of the additional imaging device 146 that are not within a subset corresponding to a region of interest. For example, the controller 148 selectively obtains data from pixels of the imaging sensor 300 based on whether the pixels are included in a subset of pixels corresponding to a selected region of interest. For example, the controller 148 obtains data (e.g., digital values based on incident light) from pixels of a imaging sensor 300 (of the imaging device 144 or of the additional imaging device 146) that are included in a subset of pixels corresponding to a selected region of interest, but does not obtain data from other pixels of the imaging sensor 300 (of the imaging device 144 or of the additional imaging device 146) that are not included in a subset of pixels corresponding to a selected region of interest. Referring to FIG. 3, in the preceding example, the controller 148 obtains digital values from pixels 305 included in region of interest 310A and from pixels 305 included in region of interest 310B, but does not obtain digital values from pixels 305 that are not included in the region of interest 310A or in the region of interest 310B. This selective acquisition of data from specific pixels corresponding to regions of interest by the controller 148 reduces bandwidth of a communication channel between the imaging sensor 300 and the controller 148 and reduces power consumption by the controller 148 or by the imaging sensor 300.

Alternatively, the controller 148 obtains data from each pixel 305 of the imaging sensor 300 (of the imaging device 144 or of the additional imaging device 146), but differently applies one or more stereo processes to data obtained from pixels 305 in a subset of pixels corresponding to an identified region of interest than to data obtained from pixels 305 that are not in at least one subset of pixels corresponding to an identified region of interest. For example, the controller 148 applies a semi-global matching process to data from a subset of pixels 305 corresponding to an identified region of interest, but does not apply the semi-global matching process to data from pixels 305 that are not included in at least one subset of pixels 305 corresponding to at least one identified region of interest. Such a selective application of the semi-global matching process to data from one or more specific subsets of pixels 305 reduces power consumption by the controller 148, which increases power efficiency of the DCA 140.

In another embodiment, the controller 148 differently applies one or more stereo processes to data from different subsets of pixels from the imaging sensor 300. For example, the controller 148 determines more precise depth information for identified regions of interest than for other regions of the image. The controller 148 may selectively apply one or more outlier rejection processes for determined depth measurements based on whether depth information is determined for a region of interest. For example, the controller 148 uses a left to right image disparity search where a pixel in the image captured by the imaging device 144 is used to identify a corresponding pixel in an image captured by the additional imaging device 146 and a right to left disparity search where a pixel in the image captured by the additional imaging device 146 is used to identify a corresponding pixel in an image captured by the imaging device 144 and compares the results from the left to right image disparity search to the right to left image disparity search to determine an accuracy of depth information determined by the controller 148. For pixels 305 within a subset corresponding to a selected region of interest, the controller 148 performs both the left to right image disparity search and the right to left image disparity search as further described above; however, for pixels 305 that are not within a subset corresponding to at least one selected region of interest, the controller 148 performs a single image disparity search (either a left to right image disparity search or a right to left image disparity search). Such a selective application of an outlier rejection process reduces power consumption by the controller 148 while maintaining accurate depth information for the selected regions of interest.

Mapping Server Providing Information about Local Area

Figure 5:
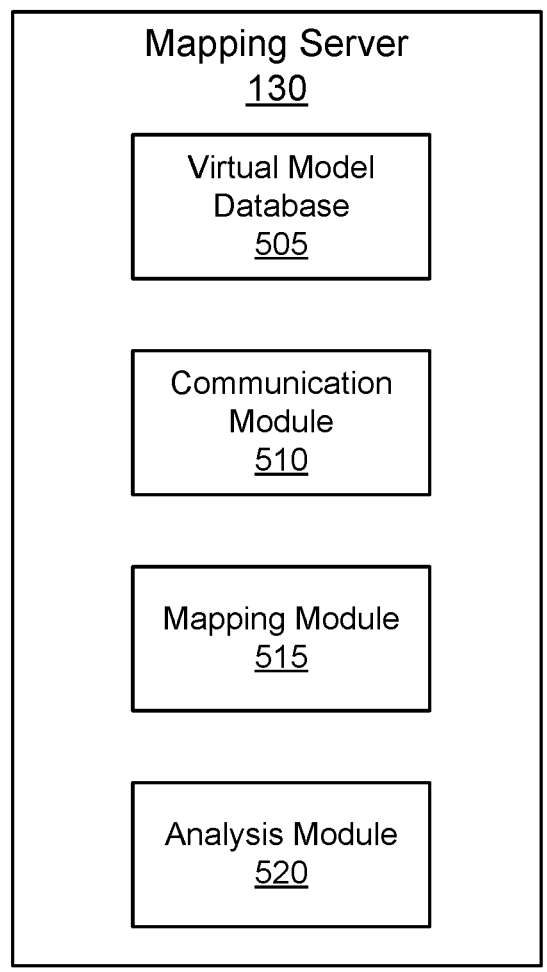
FIG. 5 is a block diagram of one embodiment of the mapping server, in accordance with one or more embodiments.

FIG. 5 is a block diagram of one embodiment of the mapping server 130. The mapping server 130 determines a set of parameters for a local area in which the headset 110 is located. For example, the parameters include depth information for different portions of the local area obtained from the headset 110, from other headsets 110 previously in the local area, or from other information. Additionally, the parameters may include contrast information describing differences in intensity in different portions of the local area. The parameters may also include acoustic parameters describing sound propagation through the local area that may be used at the headset 110 to transform an audio signal associated with an object (e.g., virtual or real object) in the room. The mapping server 130 includes a virtual model database 505, a communication module 510, a mapping module 515, and an analysis module 520. In other embodiments, the mapping server 130 can have any combination of the modules listed with any additional modules. In some other embodiments, the mapping server 130 includes one or more modules that combine functions of the modules illustrated in FIG. 5. A processor of the mapping server 130 (not shown in FIG. 5) may run some or all of the virtual model database 505, the communication module 510, the mapping module 515, the acoustic analysis module 520, one or more other modules or modules combining functions of the modules shown in FIG. 5.

The virtual model database 505 stores a virtual model describing a plurality of physical spaces and properties of those physical spaces, such as depth information or contrast information, as well as acoustic information. Each location in the virtual model corresponds to a physical location of the headset 110 within a local area having a specific configuration that represents condition of the local area having a unique set of acoustic properties represented with a unique set of parameters. A particular location in the virtual model may correspond to a current physical location of the headset 110 within a room or within the local area. Each location in the virtual model is associated with a set of parameters for a corresponding physical space that represents one configuration of the local area. For example, the set of parameters represents depth information from the current physical location of the headset 110 to other objects or locations within the local area, and may also identify contrast information for different locations within the local area from the current physical location of the headset 110.

The communication module 510 is a module that communicates with the headset 130 via a network. The communication module 510 receives, from the headset 110, visual information describing at least the portion of the local area. In one or more embodiments, the visual information includes image data for at least the portion of the room local area. For example, the communication module 510 receives depth image data captured by the DCA 140 of the headset 110 with information about a shape of the local area based on by surfaces within the local area room (e.g., walls, floor and ceiling of the room local area). The communication module 510 may also receive color image data captured by the passive camera assembly (PCA) 150 of the headset 110. The communication module 510 may provide the visual information received from the headset 110 (e.g., the depth image data and the color image data) to the mapping module 515. In other embodiments, the communication module 510 receives information about the local area from the console 180 coupled to the headset 110, or from any other suitable source. Additionally, the communication module 510 may receive location information from the headset 110 or from the console 180, with the location information identifying a geographic location or a physical location of the headset 110.

The mapping module 515 maps the visual information received from the headset 110 to a location of the virtual model or maps location information of the headset 110 to a location of the virtual model. The mapping module 515 determines the location of the virtual model corresponding to a current physical space where the headset 110 is located within the local area. The mapping module 315 searches through the virtual model to find mapping between (i) the visual information that includes at least information about geometry of surfaces of the local area and (ii) a corresponding configuration of the local area within the virtual model. The mapping is performed by matching the geometry information of the received visual information with geometry that is stored as part of the configuration of the local area within the virtual model. The corresponding configuration of the local area within the virtual model corresponds to a model of the local area where the headset 110 is currently located. If no matching is found, this is an indication that a current configuration of the local area is not yet modeled within the virtual model. In such case, the mapping module 515 informs the analysis module 520 that no matching is found matching is found, and the analysis module 520 determines a set of parameters based at least in part on the received visual information.

The analysis module 520 determines the set of parameters associated with the local area corresponding to the physical location of the headset 110, based in part on the determined location in the virtual model obtained from the mapping module 515 and parameters in the virtual model associated with the determined location. In some embodiments, the analysis module 520 retrieves the set of parameters from the virtual model, as the set of parameters are stored at the determined location in the virtual model that is associated with a specific configuration of the local area. In some other embodiments, the analysis module 520 determines the set of parameters by adjusting a previously determined set of parameters for a specific configuration of the local area in the virtual model, based at least in part on the visual information received from the headset 110. For example, the analysis module 320 may run off-line depth mapping or contrast analysis using the received visual information to determine the set of parameters.

In some embodiments, the analysis module 520 determines that previously generated parameters are not consistent with a configuration of the current physical location of the headset 110 by analyzing visual information (e.g., images) received from the headset 110. In response to detecting such an inconsistency, the analysis module 520 generates an updated set of parameters from the visual information received from the headset and updates the virtual model to include the updated set of parameters as a replacement for the previous set of parameters or as an additional configuration for the same local area. In some embodiments, the analysis module 520 estimates a set of parameters by analyzing the visual information, and other information (e.g., audio data) received from the headset 110. In other embodiments, the analysis module 520 derives a set of parameters by applying one or more stereo processes, as further described above in conjunction with FIGS. 1 and 4, using images received from the headset 110. The analysis module 520 provides the derived set of parameters to the communication module 510 that communicates the set of parameters from the mapping server 130 to the headset 110 via the network or via another suitable communication channel.

FIG. 6 is an example of a virtual model 600 describing local areas and parameters describing configuration of the local areas. The virtual model 600 may be stored in the virtual model database 505 of the mapping server 130. The virtual model 600 may represent geographic information storage area in the virtual model database 505 that stores geographically tied triplets of information (i.e., a local area identifier (ID) 605, a local area configuration ID 610, and a set of c parameters 615) for various local areas surrounding one or more headsets 110.

The virtual model 600 includes a listing of possible local areas S1, S2, . . . , Sn, each identified by a unique local area ID 605. A local area ID 605 uniquely identifies a particular type of local area. For example, a local area ID 605 identifies different types or rooms, such as a conference room, a bathroom, a hallway, an office, a bedroom, a dining room, a living room, some other type of physical space, or some combination thereof. Thus, each local area ID 605 corresponds to one particular type of physical space.

Each local area ID 605 is associated with one or more local area configuration IDs 610. Each local area configuration ID 605 corresponds to a configuration of a local area identified by the local area ID 605 that has specific depth information or contrast information. The local area configuration ID 650 may include information identifying a number of objects in the local area, positioning of objects within the local area an identification, ambient lighting of the local area, or other conditions within the local area. Different configurations of the local area affect depth information to different regions of the local area or contrast information from different regions of the local area. Each local area configuration ID 610 may be represented as a unique code ID (e.g., a binary code, an alphanumeric code) that identifies a configuration of a local area ID 605. For example, as illustrated in FIG. 4, the local area S1 can be associated with p different space configurations S1C1, S1C2, . . . , S1Cp each representing a different configuration of local area S1; the local area S2 can be associated with q different configurations S2C1, S2C2, . . . , S2Cq each representing a different configuration of local area S2; the local area Sn can be associated with r different configurations SnC1, SnC2, . . . , SnCr each representing a different configuration of local area Sn. The mapping module 515 may search the virtual model 600 to find an appropriate local area configuration ID 610 based on visual information of a local area received from the headset 110.

Each local area configuration ID 615 is associated with a specific set of parameters 615 stored in a corresponding location of the virtual model 600. As illustrated in FIG. 6, p different space configurations S1C1, S1C2, . . . , S1Cp of the same local area S1 are associated with p different sets of parameters {P11}, {P12}, . . . , {P1p}. Similarly, as further illustrated in FIG. 6, q different space configurations S2C1, S2C2, . . . , S2Cq of the same local area S2 are associated with q different sets of acoustic parameters {P21}, {P22}, . . . , {P2q}; and r different space configurations SnC1, SnC2, . . . , SnCr of the same local area Sn are associated with r different sets of parameters {Pn1}, {Pn2}, . . . , {Pnr}. The analysis module 520 may retrieve a corresponding set of acoustic parameters 615 from the virtual model 610 when the mapping module 515 finds a local area configuration ID 610 corresponding to a current configuration of a local area where the headset 110 is located.

Depth Camera Assembly Adjusting Propagation of Depth Information Between Pixels

Figure 7A:
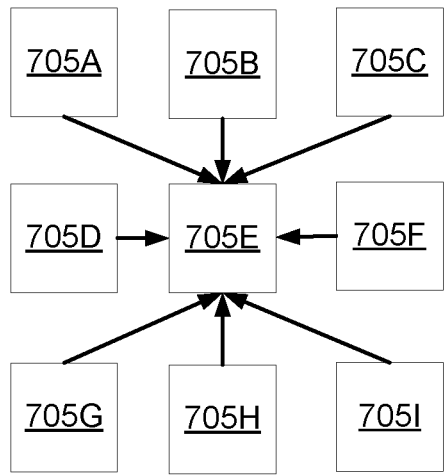
FIGS. 7A-7D are process flow diagrams of an example of a depth camera assembly 140 adjusting propagation of depth information determined for a pixel of a sensor to adjacent pixels of a sensor, in accordance with one or more embodiments.
Figure 7B:
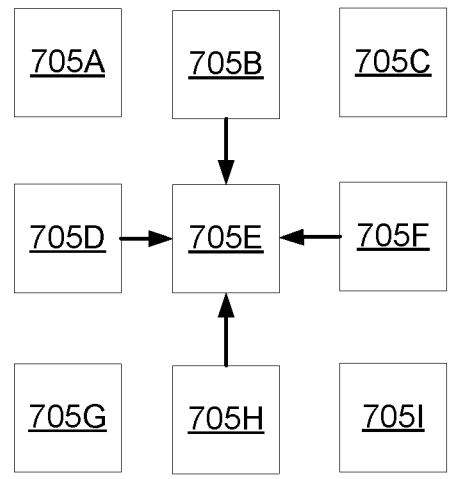
Figure 7C:
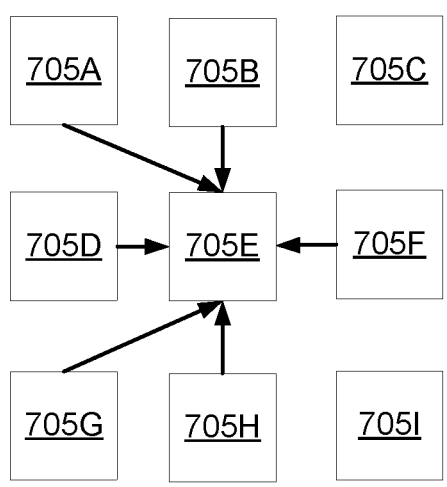
Figure 7D:
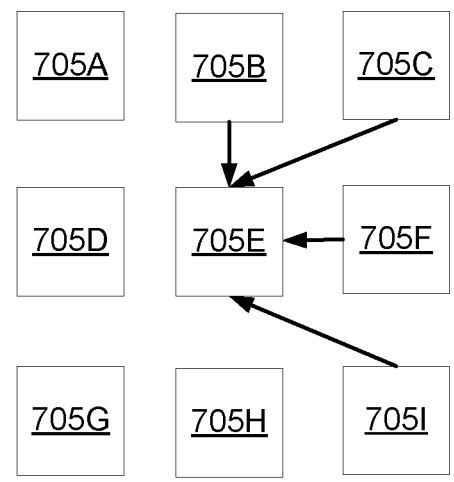

FIGS. 7A-7D are process flow diagrams of an example of the controller 148 of the depth camera assembly (DCA) 140 adjusting propagation of depth information determined for a pixel to adjacent pixels. For purposes of illustration, FIGS. 7A-7D depict a three by three array of pixels 705A-705I, where the controller 148 is determining depth information for pixel 705E. In FIG. 7A, the controller 148 propagates depth information for each pixel 705A, 705B, 705C, 705D, 705F, 705G, 705H, 705I adjacent to pixel 705A when determining depth information for pixel 705E; this belief propagation of depth information for neighboring pixels 705A, 705B, 705C, 705D, 705F, 705G, 705H, 705I to determination of depth for pixel 705A results in a smoother depth map of the local area surrounding the DCA. FIGS. 7B-7D show alternative configurations where the controller 148 uses depth information determined for a subset of pixels 705A, 705B, 705C, 705D, 705F, 705G, 705H, 705I adjacent to pixel 705A when determining depth information for pixel 705E; in FIGS. 7B-7D, the subset of pixels 705A, 705B, 705C, 705D, 705F, 705G, 705H, 705I adjacent to pixel 705A when determining depth information for pixel 705E each include less than a total number of pixels 705A, 705B, 705C, 705D, 705F, 705G, 705H, 705I adjacent to pixel 705A. In FIG. 7B, the controller 148 uses depth information from pixels 705B, 705D, 705F, and 705H to determine depth information for pixel 705E. Alternatively, in FIG. 7C, the controller 148 uses depth information from pixels 705A, 705B, 705D, 705F, 705G, and 705H to determine depth information for pixel 705E. FIG. 7D shows an alternative where the controller 148 uses depth information from pixels 705B, 705C, 705F, and 705I to determine depth information for pixel 705E. Hence, to determine depth information for pixel 705E, FIGS. 7A-7D show alternative subsets of pixels adjacent to pixel 705E from which the controller 148 uses depth information to determine the depth information for pixel 705E.

Contribution of depth information from pixels 705A, 705B, 705C, 705D, 705F, 705G, 705H, 705I having different positions relative to pixel 705E to determination of depth information for pixel 705E depends on characteristics of the local area of which the DCA 140 captures images. To conserve power and computational resources, the controller 148 selects different subsets of pixels 705A, 705B, 705C, 705D, 705F, 705G, 705H, 705I neighboring pixel 705E and determines depth information for pixel 705E using each of the different subsets of pixels 705A, 705B, 705C, 705D, 705F, 705G, 705H, 705I neighboring pixel 705E. Based on the depth information resulting from each of the different subsets of pixels neighboring pixel 705E, the controller 148 selects a specific subset of pixels 705A, 705B, 705C, 705D, 705F, 705G, 705H, 705I neighboring pixel 705E from which depth information is used to determine depth information for pixel 705E. This allows the controller 148 to reduce a number of neighboring pixels 705A, 705B, 705C, 705D, 705F, 705G, 705H, 705I used to determine depth information for pixel 705E to conserve power and other computational resources when determining depth information for pixel 705E while determining accurate depth information for pixel 705E. The controller 148 may modify the subset of neighboring pixels 705A, 705B, 705C, 705D, 705F, 705G, 705H, 705I used to determine depth information for pixel 705E over time, allowing the controller 148 to account for changing conditions in images captured by the DCA 120 and adjust the subset of neighboring pixels 705A, 705B, 705C, 705D, 705F, 705G, 705H, 705I used to determine depth information for pixel 705E accordingly.

In some embodiments, the controller 148 determines differences between depth information for pixel 705E determined from depth information for different subsets of pixels 705A, 705B, 705C, 705D, 705F, 705G, 705H, 705I neighboring pixel 705E and depth information previously determined for pixel 705E and selects a subset of pixels 705A, 705B, 705C, 705D, 705F, 705G, 705H, 705I neighboring pixel 705E having a minimum difference or having a difference less than a threshold value. The depth information previously determined for pixel 705E may be obtained by the controller 148 from the mapping server 130 or may be depth information for pixel 705E determined by the controller 148 from images captured at one or more prior times. Alternatively or additionally, the controller 148 determines confidence measurements for depth information determined from depth information for different subsets of pixels 705A, 705B, 705C, 705D, 705F, 705G, 705H, 705I neighboring pixel 705E and selects a specific subset of pixels determined from depth information for different subsets of pixels 705A, 705B, 705C, 705D, 705F, 705G, 705H, 705I neighboring pixel 705E resulting in depth information having a maximum confidence measurement or having at least a threshold confidence measurement. The controller 148 may determine confidence measurements for different depth information based on previously determined depth information for pixel 705E obtained by the controller 148 from the mapping server 130 or may be depth information previously determined for pixel 705E by the controller 148 from images captured at one or more prior times.

In various embodiments, the controller 148 selects different subsets of pixels 705A, 705B, 705C, 705D, 705F, 705G, 705H, 705I neighboring pixel 705E depending on whether pixel 705E is included in a region of interest a region of interest in an image captured by the imaging device 144 or by the additional imaging device 146, as further described above in conjunction with FIG. 4. For example, the controller 148 uses depth information for each pixel 705B, 705C, 705D, 705F, 705G, 705H, 705I neighboring pixel 705E in response to pixel 705E being included in a region of interest, and selects a subset of pixels 705B, 705C, 705D, 705F, 705G, 705H, 705I neighboring pixel 705E for determining depth information of pixel 705E, as further described above, in response to determining pixel 705E is not included in a region of interest. This allows the controller 148 to provide higher-quality depth information for pixels within a region of interest, while conserving power by using depth information from fewer neighboring pixels to determine depth information for a pixel that is not included in a region of interest. Hence, the controller 148 may differently propagate depth information from neighboring pixels when determining depth information for a target pixel that is within a region of interest of an image than when determining depth information for a target pixel that is not within a region of interest of an image. In some embodiments, the controller 148 uses texture or contrast information of an image (which may be determined from prior images of the local area or from the image itself) when selecting neighboring pixels from which depth information is propagated to a target pixel for which depth information is determined. For example, the controller 148 selects a smaller number of neighboring pixels from which depth information is propagated to a target pixel within a region of an image that has higher contrast or texture relative to other regions of the image or that has at least a threshold contrast or texture; in the preceding example, the controller 148 selects a larger number of neighboring pixels from which depth information is propagated to a target pixel within a region of an image that has lower contrast or texture relative to other regions of the image or that has less than the threshold contrast or texture.

Concurrent Correspondence Check of Depth Information by Depth Camera Assembly

Figure 8:
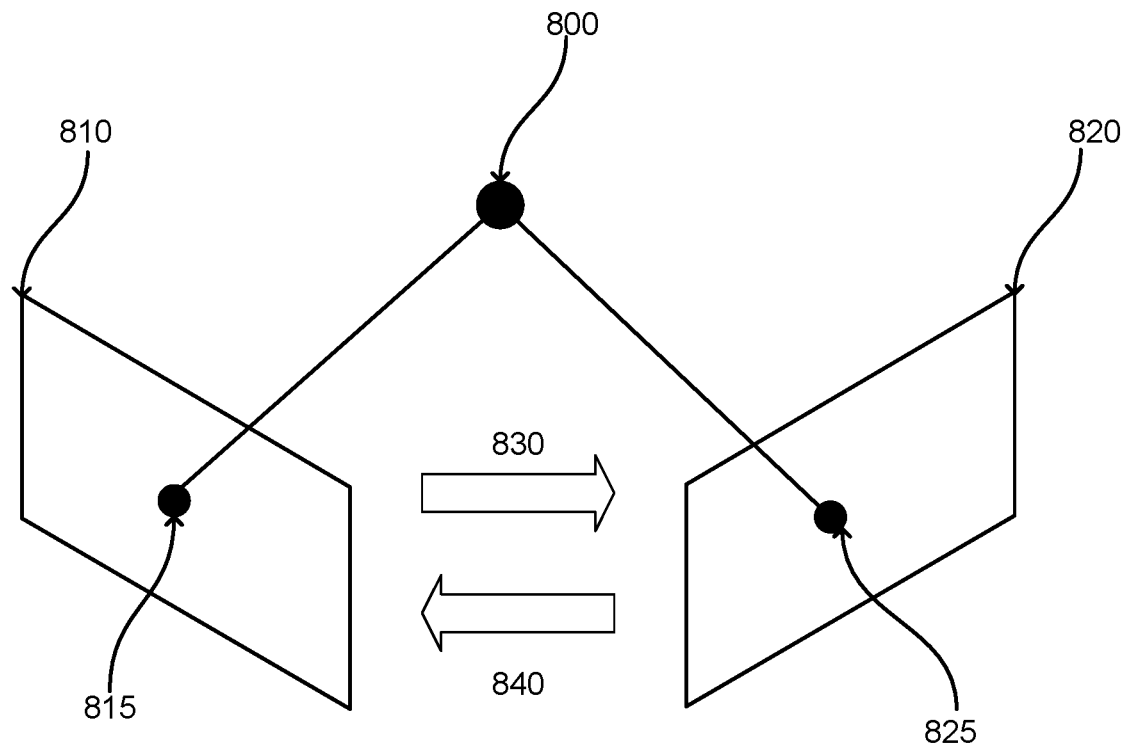
FIG. 8 shows a process flow diagram of a performing a bi-directional disparity search between images captured by different imaging devices, in accordance with one or more embodiments.

As further described above, in various embodiments, the controller 148 applies one or more outlier rejection processes for determined depth measurements. In various embodiments, the controller 148 uses a left to right image disparity search where a pixel in an image captured by the imaging device 144 is used to identify a corresponding pixel in a corresponding additional image captured by the additional imaging device 146 and a right to left disparity search where a pixel in the additional image captured by the additional imaging device 146 is used to identify a corresponding pixel in the corresponding image captured by the imaging device 144. FIG. 8 shows a process flow diagram of performing a bi-directional disparity search between images captured by different imaging devices. In the example of FIG. 8, an object 800 is included in a local area. An imaging device 144 captures an image 810 of the local area including the object 800, and an additional imaging device 146 captures an additional image 820 of the local area including the object 800.

To evaluate depth measurements for objects in the local area, such as when performing a stereo global matching stereo process, the controller 148 selects the image 810 captured by the imaging device 144 as a baseline image and compares 830 pixels in the image 810 to corresponding pixels in the additional image 820; regarding the example shown by FIG. 8, this is a left to right disparity search from image 810 to additional image 820. The pixel in the additional image 820 corresponding to a pixel in the image 810 is a pixel in the additional image 820 including a common object, or a common portion of an object, as a pixel in the image 810. The controller 148 identifies pixels in the additional image 820 captured by the additional imaging device 146 corresponding to pixels in the image 810 captured by the imaging device 144. For example, the controller 148 identifies pixel 815 in the image 810 as including the object 800, and determines that pixels 825 in the additional image 820 as including the object 800; hence, pixel 825 in the additional image 820 corresponds to pixel 815 in the image 810. Based on coordinates of pixel 815 in image 810 and coordinates of pixel 825 in image 820, the controller 148 determines a distance between the coordinates of pixel 815 in image 810 and the coordinates of pixel 825 in image 820. Subsequently, the controller 148 stores the determined distance in association with coordinates of pixel 815. The controller 148 generates a disparity mapping from the comparison 830 of the image 810 to the additional image 820, where the disparity mapping includes a distance between each pixel of the image 810 and a corresponding pixel in the additional image 820.

After comparing 830 the image 810 to the additional image 820 using the image 810 as a baseline image, the controller 148 subsequently selects the additional image 820 captured by the additional imaging device 146 as the baseline image and compares 840 pixels in the additional image 820 to corresponding pixels in the image 810; in the example shown by FIG. 8, this is a right to left disparity search from the additional image 820 to the image 810. The controller 148 selects a pixel from the additional image 820 and identifies a corresponding pixel in the image 810 captured by the imaging device 144. For example, the controller 144 identifies pixel 825 in the additional image 820 as the object 800, and determines that pixel 815 in the image 820 corresponds to the object 800, as both pixel 815 and pixel 825, so the controller 144 determines that pixel 815 corresponds to pixel 825 because both include the object 800. Based on coordinates of pixel 815 in image 810 and coordinates of pixel 825 in image 820, the controller 148 determines a distance between the coordinates of pixel 815 in image 810 and the coordinates of pixel 825 in image 820, and stores the distance in association with coordinates of pixel 825. The controller 148 generates an additional disparity mapping from the comparison 840 of the additional image 820 to the image 810, where the additional disparity mapping includes a distance between each pixel of the additional image 820 and a corresponding pixel in the image 820.

Figure 9:
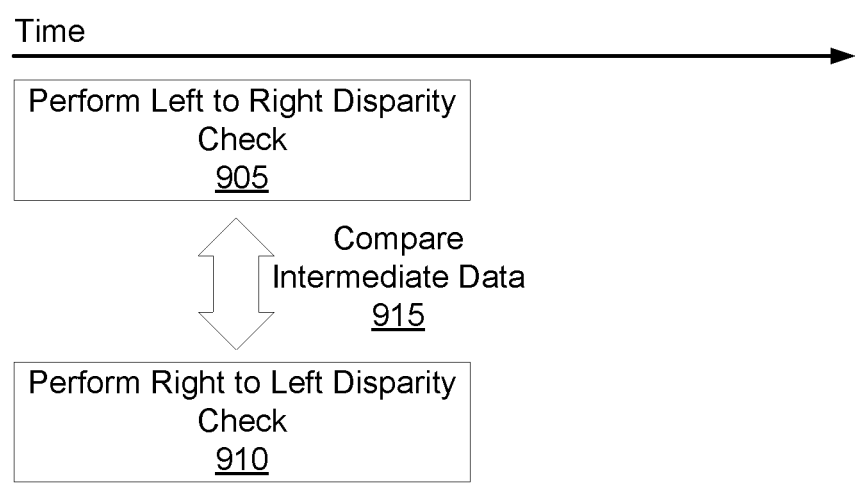
FIG. 9 is a process flow diagram of concurrently performing different disparity searches between images captured by different imaging devices, in accordance with one or more embodiments.

To conserve power and other computational resources, in various embodiments, the controller 148 concurrently performs a left to right image disparity search and the right to left image disparity search on a pair of images captured by the imaging device 144 and the by the additional imaging device 148. FIG. 9 is a process flow diagram of one embodiment of a depth camera assembly (DCA) 140 controller 148 concurrently performing different disparity searches. As shown in FIG. 9, the controller performs 905 a left to right disparity check on an image captured by the imaging device 144 and an additional image captured by the additional imaging device 146, while concurrently performing 910 a right to left disparity check on the image and the additional image. While the left to right and the right to left disparity checks are concurrently performed, the controller 148 compares 915 intermediate values determined during the left to right disparity check and during the right to left disparity check to evaluate depth information determined from the image and from the additional image.

Referring to the example shown in FIG. 8, to concurrently perform the right to left and left to right disparity check, the controller 148 uses image 810 as a baseline image, identifies pixels in the additional image 820 corresponding to pixels in the image 810, as further described above, and determines distances between each pixel in the image 810 and its corresponding pixel in the additional image 820. In parallel, the controller 148 uses additional image 820 as the baseline image, identifies pixels in the image 810 corresponding to pixels in the additional image 820, as further described above, and determines distances between each pixel in the additional image 820 and its corresponding pixel in the image 810. When determining distances between corresponding pixels in the image 810 and the additional image 820, the controller 148 determines measures of confidence for the distances in various embodiments, and compares 915 the confidence values for different distances, as the distances are determined, to determine a confidence in depth values determined for each pixel of the image 810 and of the additional image 820. This allows the controller 148 to more efficiently evaluate different disparity mappings based on images captured by the image capture device 144 and by the additional image capture device 148.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A depth camera assembly comprising:
a plurality of imaging sensors, each sensor configured to capture images of a local area and each imaging sensor comprising an array of pixels; and
a controller coupled to each of the plurality of image sensors, the controller configured to:
select a region of interest in an image captured by the plurality of image sensors based on prior information describing the local area,
identify a subset of pixels of an imaging sensor corresponding to the selected region of interest in the image, and
generate depth information for the local area by differently processing values obtained from the subset of pixels than from values obtained from other pixels of the imaging sensor that are not in the subset of pixels by:
retrieving data from each pixel of the sensor; and
applying a stereo imaging process to data retrieved from pixels in the subset of pixels and differently applying the stereo imaging process to data retrieved from pixels not in the subset of pixels.

2. The depth camera assembly of claim 1, wherein applying the stereo imaging process to data retrieved from pixels in the subset of pixels and differently applying the stereo imaging process to data retrieved from pixels not in the subset of pixels comprises:
    applying an outlier rejection process to depth information generated from data retrieved from pixels in the subset of pixels, while applying an alternative depth outlier rejection process to depth information generated from data retrieved from pixels not in the subset of pixels.

3. The depth camera assembly of claim 2, wherein the outlier rejection process comprises both a left to right disparity search and a right to left disparity search, and the alternative outlier rejection process comprises one selected from a group consisting of: the left to right disparity search and the right to left disparity search.

4. The depth camera assembly of claim 1, wherein select the region of interest in the image captured by the plurality of image sensors based on prior information describing the local area comprises:
    receive information describing the local area from a mapping server; and
    select the region of interest as a region of the image for which the information received from the mapping server has a specific characteristic.

5. The depth camera assembly of claim 1, wherein generate depth information for the local area by differently processing values obtained from the subset of pixels than from values obtained from other pixels of the imaging sensor that are not in the subset of pixels further comprises:
    propagate depth information from pixels neighboring a pixel of the subset of pixels to the pixel of the subset of pixels differently than propagating depth information from pixels neighboring an additional pixel that is not in the subset of pixels to the additional pixel.

6. The depth camera assembly of claim 5, wherein propagate depth information from pixels neighboring the pixel of the subset of pixels to the pixel of the subset of pixels differently than propagating depth information from pixels neighboring the additional pixel that is not in the subset of pixels to the additional pixel comprises:
    decrease a number of pixels neighboring the additional pixel for which depth information is propagated to the additional pixel relative to a number of pixels neighboring the pixel for which depth information is propagated to the pixel.

7. The depth camera assembly of claim 1, wherein the controller is further configured to:
    perform a plurality of disparity searches in parallel between disparity check between the image and an additional image.

8. The depth camera assembly of claim 7, wherein perform the plurality of disparity searches in parallel between disparity check between the image and the additional image in parallel comprises:
    perform a left to right disparity search between the image and the additional image; and
    perform a right to left disparity search between the additional image and the image in parallel with the left to right disparity search.

9. The depth camera assembly of claim 1, further comprising:
    a light projector coupled to the controller, the light projector configured to project a structure light pattern including a plurality of structured light elements into the local area.

10. The depth camera assembly of claim 9, wherein identify the subset of pixels of the imaging sensor corresponding to the selected region of interest in the image comprises:
    identify the region of interest as a region within the local area that the controller determines has at least a threshold likelihood of being illuminated by a light projector.

11. A computer program product comprising a non-transitory computer-readable storage medium having instructions encoded thereon that, when executed by a processor, cause the processor to:
    capture images of a local area using a plurality of imaging sensors, each imaging sensor comprising an array of pixels;
    select a region of interest in an image captured by the plurality of image sensors based on prior information describing the local area,
    identify a subset of pixels of an imaging sensor corresponding to the selected region of interest in the image, and
    generate depth information for the local area by differently processing values obtained from the subset of pixels than from values obtained from other pixels of the imaging sensor that are not in the subset of pixels by:
        retrieving data from each pixel of the sensor; and
        applying a stereo imaging process to data retrieved from pixels in the subset of pixels and differently applying the stereo imaging process to data retrieved from pixels not in the subset of pixels.

12. The computer program product of claim 11, wherein select the region of interest in the image captured by the plurality of image sensors based on prior information describing the local area comprises:
    receive information describing the local area from a mapping server; and
    select the region of interest as a region of the image for which the information received from the mapping server has a specific characteristic.

13. The computer program product of claim 11, wherein generate depth information for the local area by differently processing values obtained from the subset of pixels than from values obtained from other pixels of the imaging sensor that are not in the subset of pixels comprises:
    propagate depth information from pixels neighboring a pixel of the subset of pixels to the pixel of the subset of pixels differently than propagating depth information from pixels neighboring an additional pixel that is not in the subset of pixels to the additional pixel.

14. The computer program product of claim 11, wherein the non-transitory computer readable storage medium further has instructions encoded thereon that, when executed by the processor, cause the processor to:
    perform a plurality of disparity searches in parallel between disparity check between the image and an additional image.

* * * * *